Inventor
Roland Botz
By Davis, Hoxie, Faithfull & Hapgood
Attorneys

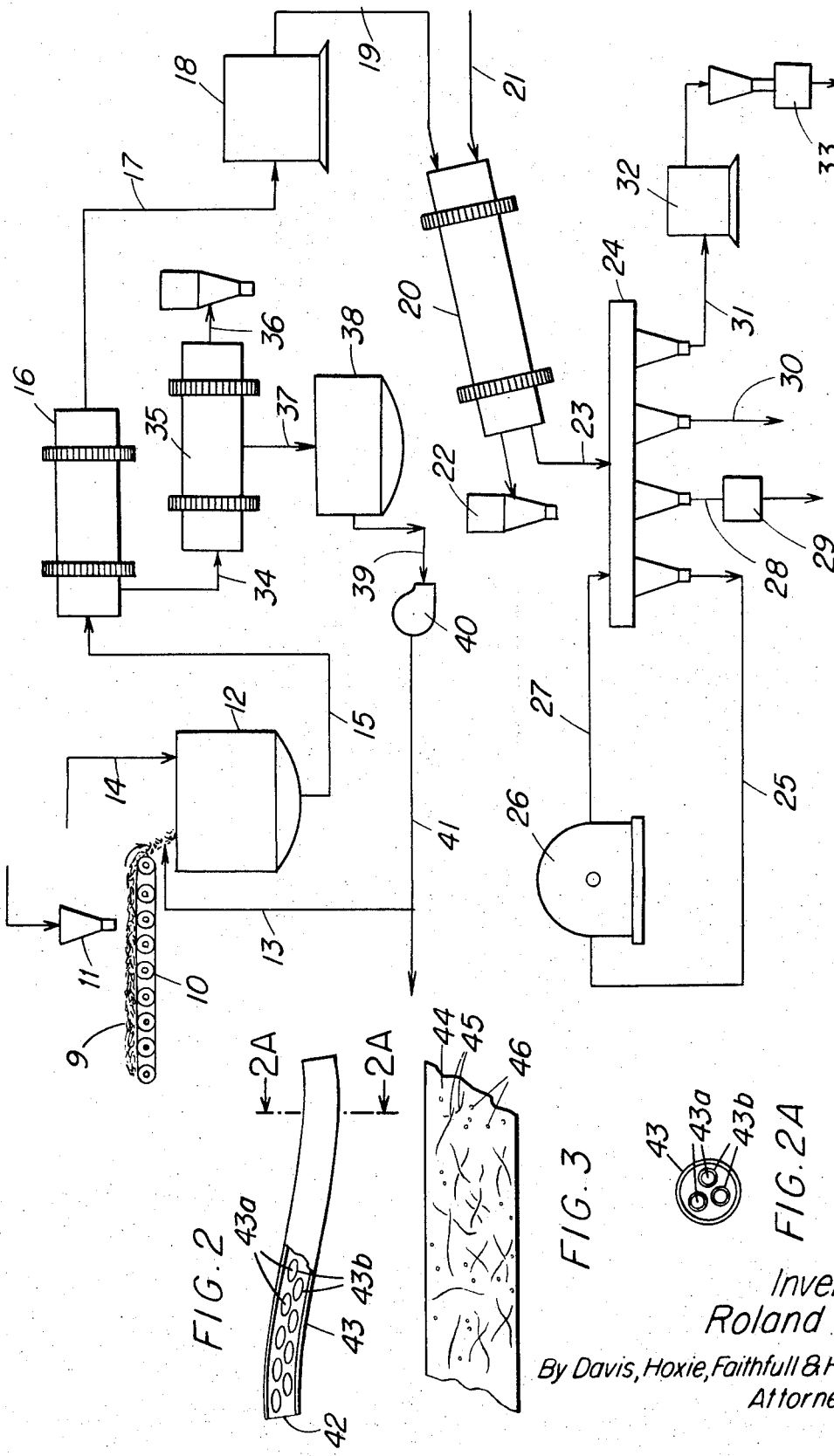

United States Patent Office 3,694,308
Patented Sept. 26, 1972

3,694,308
BAGASSE FIBER PRODUCT AND PROCESS
Roland Botz, San Juan, Puerto Rico, assignor to Plasti-Fiber Formulations, Inc., Mercedita, Puerto Rico
Continuation-in-part of application Ser. No. 758,903, Sept. 10, 1958. This application Oct. 9, 1969, Ser. No. 866,123
Int. Cl. D21c 9/08
U.S. Cl. 162—55                                7 Claims

ABSTRACT OF THE DISCLOSURE

Bagasse is treated with an aqueous solution of alum and defibrated to give a fibrous product suitable for the reinforcement of resin bodies. The fiber can also be pulverized to yield a flour suitable for use as a filler in resin bodies. The treatment also produces a clean, sugar free, moisture resistant, low density cellular pith material suitable for manufacturing insulation and acoustical materials, as a filler for synthetic foam products, and as a filler for animal feed formulations.

---

This application is a continuation-in-part of my application Ser. No. 758,903, filed Sept. 10, 1958 now abandoned.

This invention relates to a method for the treatment of bagasse to separate its fibrous components from the sugar, pith and dirt normally associated therewith, to yield, among other products, novel reinforcing and filling media for synthetic resin bodies. The invention also related to methods of filling and reinforcing plastic bodies by the use of such media, and the filled and reinforced bodies so obtained.

Bagasse is a by-product of sugar refining and consists, in general terms, of the fibrous, woody, mangled material left after the bulk of the sugar-containing juices have been extracted from sugar cane. Although attempts have been made for many years to find some profitable use for bagasse these attempts have met with very modest success, at best, and most bagasse is still burned as fuel. One reason for this lack of success appears to have been the difficulty of extracting residual sugars from the bagasse and of separating the fibrous material from the soft pith with which it is intimately associated.

In a completely different field, namely that of manufacturing articles from synthetic resins as by molding techniques, there has arisen a need for an inexpensive reinforcing material. The most widely used fiber used for reinforcing purposes is glass; it is, however, quite expensive and it would be of great interest to the plastics industry to have available an inexpensive reinforcing fiber which could replace glass fiber.

The present invention provides an economical and convenient way for solving these two apparently unrelated problems. It provides a simple procedure, using relatively inexpensive, easily obtainable reactants and standard apparatus for converting bagasse into a useful fibrous product; or alternatively into a flour or powder. Further, in accordance with the invention, the fibrous product or the flour can be incorporated into synthetic resin compositions and shaped into useful bodies, the fibers serving as reinforcing elements in such bodies and the flour acting as a filler.

In accordance with the invention, bagasse is converted into the useful products just referred to by a process which includes contacting the bagasse preferably after an initial dry mechanical attrition treatment, but without any preliminary chemical tratment such as pulping or digesting with an aqueous solution of an alum for a time sufficient to leach out substantially all the residual sugar in the fibrous portion of the bagasse. Concurrently with this sugar solvation, or subsequently, the bagasse is subjected to mechanical attrition to defibrate it, i.e. to free the fibers from the pith and pulpy matter. The fibers are then separated from the pulp and from other foreign matter such as dirt and sand, and dried. A certain amount of the alum is retained in the fibers. If a flour is the desired product, the fibers are milled to reduce them to powdered form.

In using fibers made according to the invention in molding processes, the fibers may be put into the form of a mat or bat for laying up; or they may be introduced into a premix with other components of the resin formulation. Flour made according to the invention may be used in various applications where wood flour or other cellulosic flour is conventionally used, for example in adhesive and potting formulations.

The invention thus further includes a method for reinforcing synthetic resin bodies which comprises introducing into said bodies during their formulation a porous bagasse reinforcing medium.

The invention further envisions a composite article comprising a synthetic resin matrix reinforced or filled with bagasse fiber or flour.

The invention will be further described with reference to the accompanying drawing in which:

FIG. 1 is a flow diagram of a process for refining bagasse according to the invention.

FIG. 2 is a schematic drawing of a segment of a bagasse fiber in accordance with the invention, partly cut away.

FIG. 2A is a schematic drawing in transverse section of fiber of FIG. 2.

FIG. 3 is a schematic view in vertical section of a portion of a reinforced filled plastic body according to the invention.

Figure 1A:
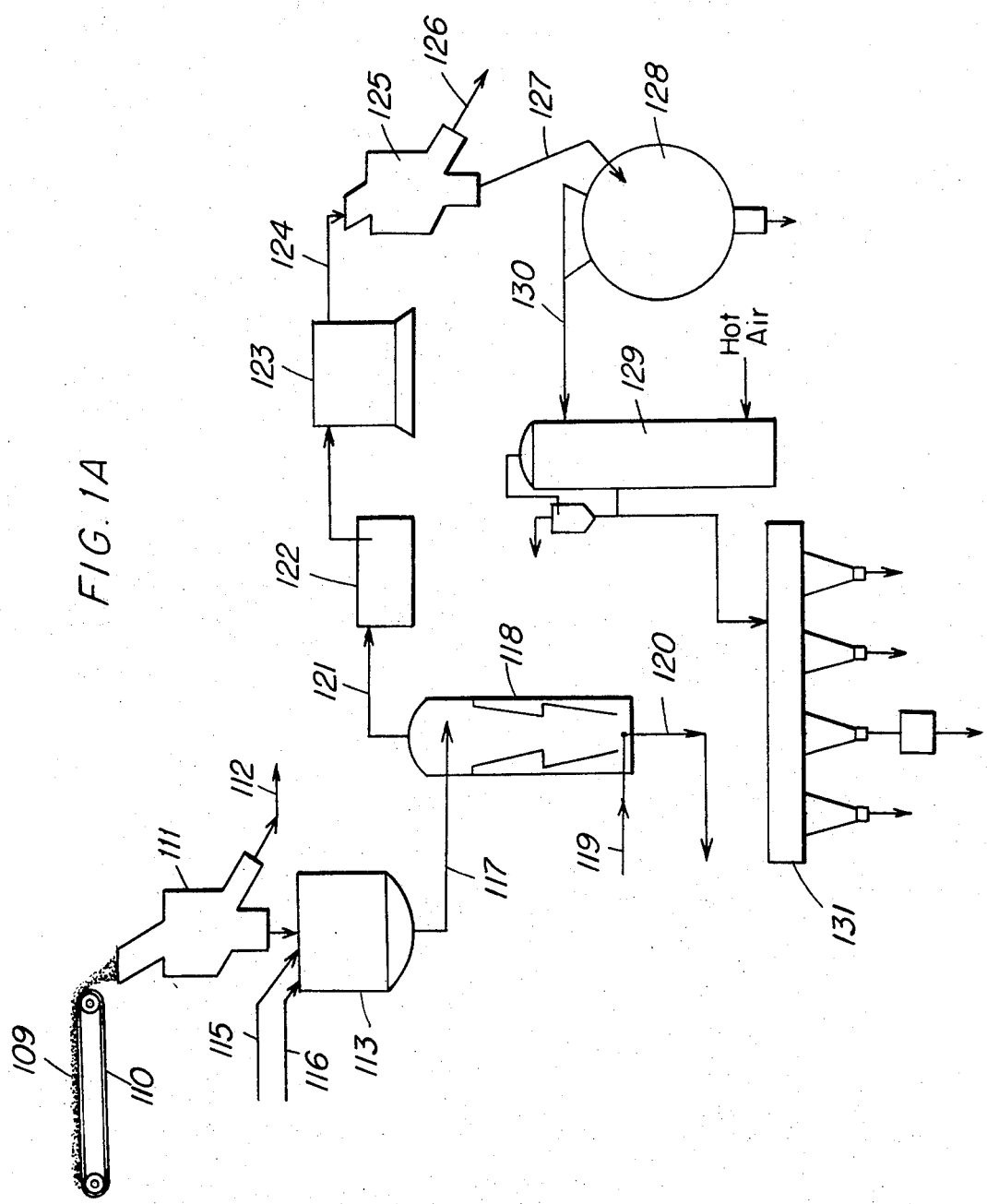
FIG. 1A is a flow diagram of a more preferred process according to the invention.

Referring first to FIG. 1, bagasse 9, is continuously deposited on a belt conveyor 10 by means of some suitable feed device, not shown. At the same time alum is continuously deposited on the conveyor 10 from a hopper 11 and the mixture of alum and bagasse is delivered to an agitating and defibering device 12 along with a quantity of water furnished through line 13. As will appear below the water furnished through line 13 is recyced from a later stage in the process. Fresh water is added as needed, through line 14.

Instead of being mixed with the bagasse, the alum may be fed directly into the device 12.

The alum used in the process may be any of the several different compounds commonly identified by that term, and having the general formula $M_2SO_4Al_2(SO_4)_3$, where M is an alkali metal or the ammonium radical, preferably K, Na or $NH_4$—. Paper maker's alum, $Al_2(SO_4)_3$, may also be used. It will be understood that the alum may be used in any degree of hydration, through the usual crystalline material contains 24 parts of water in the molecule.

The proportion of alum used will vary to some extent with the type of alum and the specific bagasse being processed. In general, however between about 1 and about 3 parts of alum, (calculated as anhydrous $Al_2(SO_4)_3$) per 100 parts of dry bagasse are used.

The proportion of water added to the agitator device 12 is also dependent on the quality of the bagasse and the type of alum used. It should be sufficient to form a free flowing slurry with the bagasse and to swell the pith or pulpy component of the bagasse. Generally between say 700 and 1,000 parts by weight of water are furnished to device 12, per 100 parts of dry bagasse.

The temperature of the water is normally ambient temperature (say 20° C. or somewhat higher in warm climates); however higher water temperatures, up to the boiling point may be used, if economic considerations warrant, and provided that other conditions, i.e. time, alum proportion, and the vigor of agitation are controlled so that the hard core fibers of the bagasse are not degraded. Temperatures lower than 20° C. and down to the freezing point may also be used where necessary, but in general this is of no beneficial effect.

The agitation and defibering device 12 functions to bring the alum and water into intimate contact with the bagasse and to swell and separate the pulp or pith component of the bagasse from the hard core fibers. A suitable standard piece of equipment for this service is the Black-Clawson Hydrapulper, manufactured by the Shartle Division, Black-Clawson Co., Middletown, Ohio. This device, though subject to some variation depending on the model employed, has, as an essential element, a bladed rotor moving in proximity to an apertured plate. The action of the rotor and the hydrodynamic forces which it creates breaks down the large clumps and chunks of bagasse to individual fibers in a relatively gentle manner without direct metal to metal contact. After an average residence time of say 2 to 20 minutes, the separated fibers are carried out through the plate apertures with very little fiber breakage, by the large volume of liquid forming through the device.

Obviously other similar devices can be used in place of the Hydrapulper.

In the device 12, the bagasse is also subjected to the chemical action of the water and alum. This appears to have several important effects. In the first place the alum stops fermentation of the sugar present in the bagasse and renders the sugar more readily removable, possibly by promoting hydrolysis. Secondly, it releases sand, dirt and pith from the fiber so that all these impurities can easily be washed away. Finally it appears to have an effect on the surface of the fiber, rendering the fiber less absorptive to resins and less sensitive to moisture.

From the defibration device 12, the pulpy slurry containing fiber, pith and dirt is sent via line 15 to a first filter screen 16. This is shown in the drawing as a rotary screen, but obviously any convenient screen or coarse filtering apparatus may be used. The bulk of the water, most of the pith particles, dirt, sand and the like are forced through the screen under pressure while the fibers remain on the screen. They are continuously removed.

Depending on the degree of defibration obtained in the device 12, the separated fibers may again be subjected to attrition by sending them, for example, via a pneumatic carrier line 17, to a pulp refiner 18 (for example a Black-Clawson Hydradisc refiner) where additional pulp-fiber separation is carried out. In some instances adequate pulp-fiber separation will be achieved in the defibration device 12 and the refiner may then be eliminated.

From the refiner 18 the semi dry fiber is sent via pneumatic line 19, to a rotary dryer 20. Here it is contacted with hot combustion gases and dired to a water content of say 6 to 14%. The combustion gases may be generated by burning fuel gas in the drier, the fuel gas being supplied via line 21.

Much of whatever minor amount of pith is retained with the fiber at the drying stage, being for the most part lighter than the dried fibers, passes overhead from the dryer 20 and may be separated in cyclone 22.

The dried fiber is carried pneumatically via line 23 to a classifier 24 where the fibers are separated from one another according to length; and from any residual pith. A suitable classifier for this service is the Air Float Table manufactured by Sutton, Steele and Steele Inc., Dallas, Texas. In this device the feed is delivered to a reciprocating inclined porous deck through which air is fed to fluidize the feed. Long fibers tend to collect at one end of the deck, extremely fine fibers at the other end and intermediate length fibers and pith particles at intermediate positions. The longer fibers are drawn off and sent via line 25 to a cutting device 26 where they are reduced in size. They are returned to classifier 24 via line 27.

Fibers having the desired particle size are drawn from classifier through line 28 and sent to a bagging operation, indicated at 29.

Pith is drawn from the classifier 24 through line 30. It may be disposed of, as by burning. However, it contains the same proportion of alum as the fibrous material, and because the hydrothermal treatment has given it water resistance, it can be usefully employed: for example, as insulation material, both thermal and acoustical; as a filler for synthetic foams; as a filler in roofing formulations; as a raw material for low density flat stock (boards); as a raw material for low density padding, for example in automobiles; and as a filler in animal feed formulations.

Short fibers are drawn off through line 31 and sent to a grinder or other attrition device 32 where they are reduced to a flour. The resulting flour is bagged at 33.

It will be understood of course that the length of the fibers recovered as such may be varied according to the nature of the ultimate use to which they are to be put, and the operation of the cutter and float table may be adjusted to maximize the length desired. For plastic reinforcing purposes fibers from say ¼" to 4" are generally used.

Returning to an early stage in the process, the liquid effluent from screen 16, is piped via line 34 to a second screen 35, which may be similar to screen 16 but with a smaller screen size. Here pith particles are separated from sand, water, dirt and the like. They are removed via line 36, and may be disposed of, or used as indicated above.

The liquid stream from screen 35 is sent via line 37 to a settling chest or basin 38 where sand, dirt, sludge and the like are removed by sedimentation. The purified water is drawn off through line 39 by pump 40. A minor quantity is continuously removed from the system and may be treated to recover sugar therefrom. The balance is recycled through lines 41 and 13.

The fibrous product recovered at 29 contains 4 to 10% water and is free from dirt, pith and sugar. It contains a small amount of alum, say from 0.1 to 0.4%, on the weight of dry fiber, some of which forms a coating on the surface of the fiber. Such fiber is shown schematically in FIGS. 2 and 2a which depicts a fiber partly cut away, the areas 42 representing the cellulosic fiber proper and the portion 43, the alum coating. It will be understood, of course, that the thickness of the coating is greatly exaggerated in the drawing. Further, it will be understood that all the alum does not remain on the outside of the fibers but penetrates the cellular structure and actually coats the inner cells 43a of the fiber, such coating being shown at 43b.

The flour drawn off at 33 will also contain a quantity of alum, some of which, will form as a coating on the flour particles in a manner analogous to that illustrated for the fiber.

In a more preferred variation of the invention shown in FIG. 1A, the bagasse is subjected to mechanical attrition in a dry state before being contacted with the alum solution. Thus referring to FIG. 1A, bagasse 109 is conveyed by a belt conveyor 110 to an attrition device 111. The preferred unit is a Rietz disintegrator Type RI–24 in which a series of hammers rotating about a vertical axis inside a vertical, cylindrical screen break up the solid particles fed to the machine, forcing the finer material through the screen and permitting larger material to pass out of the machine in a vertical direction. When bagasse is subjected to treatment of this nature the pith passes through the screen. It is removed through a line 112, while the fiber passes downwardly into a wet defibrating unit 113. This defibrating unit 113 is in general the same as the unit 12 of FIG. 1, suitably a Black-Clawson Hydrapulper. Water and alum are supplied to the unit 113 through lines 115 and 116 respectively. The proportion of water is in general between about 700 and about 1000 parts by weight per 100 parts of dry fiber fed to the hydrapulper. The proportion of alum is in general between about 1 and about 3 parts by weight per 100 parts of dry fiber.

The fiber slurry is then sent through line 117 to a gravity separating device 118 for removal of sand and other heavy contaminants. The most suitable unit for this service is a liquid cyclone. In such a device (for example the model manufactured by the Black-Clawson Company) the slurry is fed tangentially into the top of a column having a tapered interior. An elutriating water stream is fed upwardly as through line 119 through the center of the column. Heavy particles are removed from the bottom through line 120, and the washed fiber is removed overhead through line 121. The fiber, as a slurry containing say 0.02 to 0.03% by weight solids is sent to a surge tank 122 and thence to a refiner 123. The refiner is a conventional pulp refiner (for example a Black-Clawson Hydrodisc refiner). Here additional pulp-fiber separation is accomplished and bundles of fibers are broken up. The slurry is then sent via line 124 to another attrition device 125, which may be identical with the device 111, for final separation of pulp and pith. As before, the more finely divided pith and any sub-size fibers are moved through the screen of the unit to waste disposal at 126. The fiber slurry is sent to a liquid/solids separator device such as the press 128, through line 127. The press 128 may be of any suitable design, but a Reitz V-Press in which the fiber is gradually compressed between two converging perforated discs is particularly suitable. From the press the fiber is sent to a dryer 128 through line 130 where its water content is reduced to say 6 to 14%. The dryer is shown in FIG. 1A as a suspension dryer but rotary driers may obviously be used instead. From the drier the fibrous product is sent to a classifier which may, if desired, be the same as that disclosed in FIG. 1.

It will be understood that the product obtained from the process described in FIG. 1A is the same as that obtained in the process of FIG. 1. The former process (FIG. 1A) is generally preferred because the initial attrition removes a substantial part of the pith which therefore need not be carried through the system and because hydraulic transport which is generally more efficient can be used to the very final stage.

As indicated earlier, a principal use for the novel fiber and flour is as a reinforcing or filling medium for molded resin articles. In such applications the bagasse fiber replaces in whole or in part fibrous reinforcing materials currently used, such as sisal, glass or asbestos. The flour replaces in whole or in part cellulosic fillers currently employed, such as wood flour. Normally the same resin formulations are employed as would be employed with more conventional fillers.

The examples which follow illustrate the use of the fibers and flour in reinforcing and filling synthetic resin articles. In these examples the fiber and flour are made in the manner described above using a bagasse initially containing 50% water. Approximately 1,000 parts by weight of water, including recycled water, and about 1 part of alum ($K_2SO_4$—$Al_2(SO_4)_3$—$24H_2O$) are used per 100 parts of dry bagasse. The final product contains about 0.1% alum and about 67% water.

EXAMPLE I

A typical premix using fibers according to the invention is made using the following formulation:

| | Parts by weight |
|---|---|
| Polyester resin (phthallic anhydrideethylene glycol base) | 1000 |
| Hardener (benzoyl peroxide) | 19 |
| Clay filler | 1500 |
| Calcium carbonate filler | 500 |
| Zinc stearate (lubricant) | 55 |
| Pigment | 20 |
| Bagasse fibers according to the invention average length ¼" | 500 |

The components are mixed in a slow speed, high shear mixer to give a putty-like dough. This is compression molded at a pressure of about 12,000 p.s.i. and a temperature of about 135° C. to form a cuplike container having good strength and appearance.

EXAMPLE II

A preform polyester formulation is formulated as follows:

| | Parts by weight |
|---|---|
| Polyester resin (phthallic anhydride-ethylene glycol base) | 300 |
| Hardener (benzoyl peroxide) | 10 |
| Clay filler | 50 |
| Calcium carbonatae filler | 200 |
| Zinc stearate (lubricant) | 20 |
| Pigment | 20 |

A mat of bagasse fibers having an average length of say 2" is laid down in the bottom of a female corrugated steel die. The total weight of fiber is about 400 parts, based on the formulation given above. The resin formulation is then poured on the fiber mat. A matching male die is brought down and the resin is shaped and cured at 20,000 p.s.i. and 300° F. to give a corrugated roofing sheet.

EXAMPLE III

A molding composition (medium impact) using the novel bagasse flour, is formulated as follows:

| | Parts by weight |
|---|---|
| Novolac resin (soluble phenolformaldehyde) | 40 |
| Hexamethylene tetramine | 6.5 |
| MgO | 2.5 |
| Calcium stearate (lubricant) | 1.8 |
| Black dye | 2.0 |
| Asbestos floats | 2.5 |
| Bagasse flour | 29.5 |
| Bagasse fiber (¼") | 12.0 |
| Plasticizer (furfural) | 3.2 |

This material is molded by compression molding as described in Example I above.

Obviously various synthetic resins may be reinforced or filled with the novel materials, in addition to the polyesters and phenolic types exemplified above. These include the epoxies, silicones, furanes, melamines and acrylics and, in injection molding applications, polystyrene, nylons and various vinyl resins.

A section of a molded article reinforced and filled with fiber and flour according to the invention is shown schematically in FIG. 3 where the resin matrix is indicated as 44, the reinforcing fibers as 45 and the particles of flour filling material as 46.

As well as being considerably less expensive than fiber glass or even sisal reinforcements, fibers according to the invention have several other advantages in resin reinforcement. Thus the alum coating appears to inhibit resin absorption into the fiber, so that the quantity of resin used may be less than with sisal. Again in a matched molding operation, the edges of the reinforcing fibers are cleanly sheared by the edge of the die, rendering it unnecessary to sand the edges of the product to remove strands of unsheared fibers normally left when glass or sisal reinforcements are used. Further, in preparing premixes, the fibers of the invention do not abrade mixing equipment as do glass fibers. At the same time, not being as rigid as sisal, they require less power for the mixing operation.

What is claimed is:

1. In a method for treating bagasse to separate fibrous components from sugars, pith and the like, the improvement which comprises contacting the bagasse raw without prior chemical treatment with a reagent consisting essentially of an aqueous solution of an alum.

2. The method claimed in claim 1 wherein the bagasse is subjected to defibration while in contact with the aqueous alum solution.

3. The method claimed in claim 1 wherein the bagasse is subjected to mechanical defibration prior to contact with the alum.

4. A method for treating bagasse to separate fibrous components from sugars, pith and the like which comprises agitating the bagasse without prior chemical treatment with a reagent consisting essentially of an aqueous alum solution, and simultaneously separating fiber from pith by mechanical action, separating the fiber from the reagent, drying the fiber, classifying the dried fiber and recovering a fiber fraction having an average length between about ¼" and about 4".

5. The method claimed in claim 4 and comprising subjecting the bagasse to mechanical defibration prior to treatment with the aqueous liquor.

6. The method claimed in claim 4 and comprising recovering a second fiber fraction of average length less than ¼" and converting said second fraction to a flour.

7. The method claimed in claim 4 and comprising recovering a third fraction of average length greater than the average length of the first fraction, cutting the third fraction to reduce its average length and recycling the cut fraction to the classifying step.

References Cited

UNITED STATES PATENTS

| 1,946,953 | 2/1934 | Sweeney | 162—96 X |
| 3,245,869 | 4/1966 | Gregory et al. | 162—55 |

FOREIGN PATENTS

| 457,171 | 11/1936 | Great Britain | 162—79 |

HOWARD R. CAINE, Primary Examiner

U.S. Cl. X.R.

162—79, 96

PO-1050
(5/69)

UNITED STATES PATENT OFFICE
CERTIFICATE OF CORRECTION

Patent No. 3,694,308                     Dated September 26, 1972

Inventor(s)  Roland Botz

It is certified that error appears in the above-identified patent and that said Letters Patent are hereby corrected as shown below:

Col. 2, line 5, "tratment" should be -- treatment -- line 54, "recyced" should be -- recycled --

Col. 5, line 49, "128" should be -- 129 --

Claim 1, line 3, after "bagasse" cancel "raw", insert -- raw -- before "bagasse".

Signed and sealed this 20th day of February 1973.

(SEAL)
Attest:

EDWARD M. FLETCHER, JR.           ROBERT GOTTSCHALK
Attesting Officer                Commissioner of Patents